Patented Apr. 19, 1938

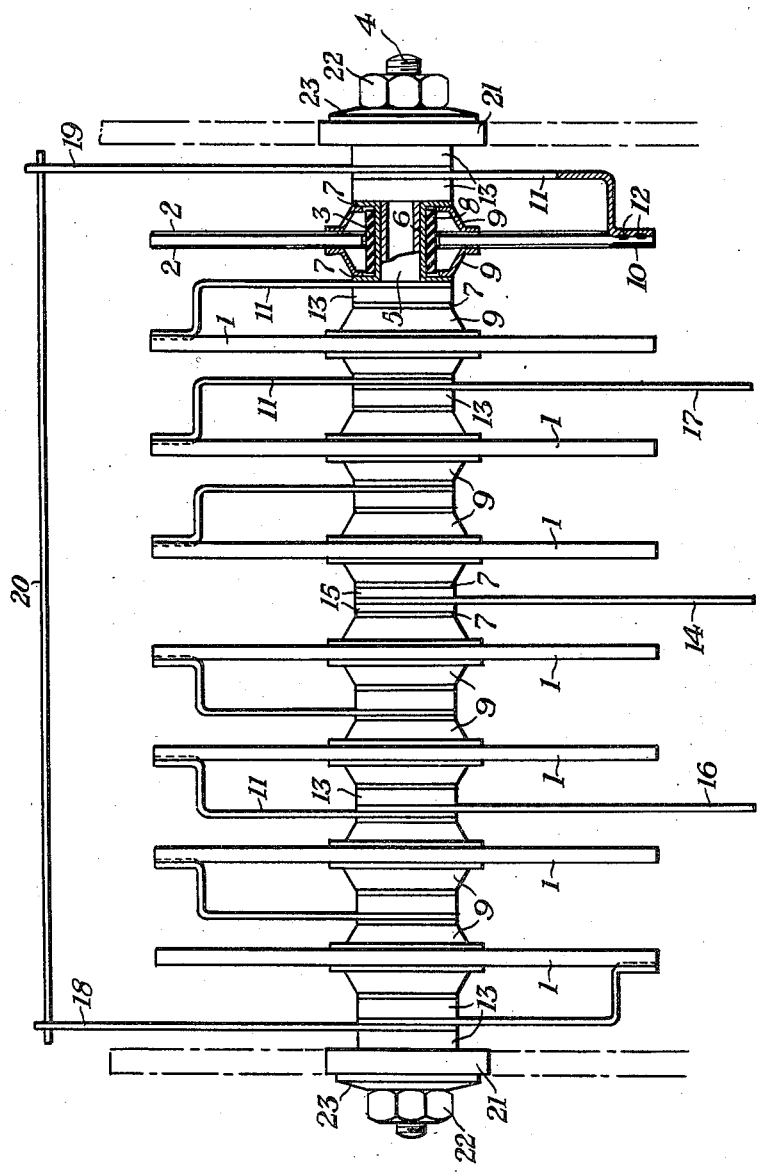

2,114,898

UNITED STATES PATENT OFFICE 2,114,898

APPARATUS FOR RECTIFYING ALTERNATING ELECTRIC CURRENTS

Jules Dormoy, Paris, France, assignor, by mesne assignments, to The Union Switch & Signal Company, Swissvale, Pa., a corporation of Pennsylvania Application December 7, 1935, Serial No. 53,388
In France July 3, 1935

6 Claims. (Cl. 175—366)

This invention relates to apparatus for rectifying alternating electric currents of the kind comprising a number of rectifying elements each comprising a disc or plate composed of a metal or metalloid having a layer of suitable material such as a compound of the metal or metalloid formed thereon or applied thereto.

The invention has for its object to provide an improved construction of rectifying apparatus of this character and more particularly relates to a construction in which each of the rectifying discs or plates is provided on both faces with a layer of compound or other applied material the several plates being assembled by means of one or more supporting rods passing through a corresponding hole or holes in the plates.

According to the principal feature of the invention the layers of compound or other material on the two faces of the same plate or disc are arranged to be electrically connected together by a flanged sleeve or bushing arranged in the hole in the plate through which the supporting rod passes, the flanges of this sleeve directly or indirectly effecting electrical contact with the layers on the two faces of the plate or disc.

According to a further feature of the invention the necessary electrical connection with each rectifying plate or disc is effected by a connecting member which is electrically spot-welded to a portion of one face of the plate or disc from which the layer of compound or other material has been removed so as to expose the body of the plate at this point.

The invention is illustrated by way of example in the accompanying drawing, the single figure of which is a somewhat diagrammatic view in side elevation, partly sectional of a rectifier constructed in accordance with one form of the invention.

Referring now to the drawing it will be seen that the rectifier illustrated comprises a number of rectifier discs or plates 1 composed of sheet copper and each provided on both faces with a layer or coating 2 of cuprous oxide covered with a metal coating formed thereon, each disc or plate 1 being provided with a central hole 3 through which a bolt 4 surrounded by an insulating sleeve 5 passes.

Surrounding the sleeve 5 in the neighbourhood of each of the discs 1 is a flanged bushing 6 composed of plastic metal such, for example, as lead, the cylindrical portion of the bushing 6 between its flanges 7 being surrounded by an insulating sleeve 8 so as to insulate the bushing 6 from the disc 1. The inner faces of the flanges 7 each engage with the central portion of a dished contact washer 9 the outer portion of which engages with the metallized surface of the adjacent oxide layer 2 on the disc 1.

The oxide coating is removed from a portion of one or both faces of each of the discs 1 as indicated at 10 and one end of a connection member or lug 11 composed of sheet metal is electrically spot-welded at several points to the exposed copper of the disc 1 as indicated at 12. The other end of the member 11 is of circular form surrounding the sleeve 5 and engaging with the outer surface of one of the flanges 7 of the bushing 6 of the adjacent disc 1. An insulating washer 13 is interposed between the member 11 and the adjacent flange 7 of the bushing 6 of the disc to which the member 11 is connected and it will be understood that by this construction the copper body of each of the discs 1 is electrically connected to the oxide layers on both faces of the next adjacent disc.

As shown in the drawing the four discs 1 of each half of the rectifier are thus connected in series with one another and a connection to the negative output terminal of the rectifier is effected by means of a connection member or lug 14 of sheet metal one end of which is of circular form surrounding the sleeve 5, a metal washer 15 being interposed between the member 14 and the opposed flanges 7 of the bushings 6 of the two middle discs 1.

The middle point of each half of the rectifier are similarly connected to the input or alternating current terminals of the rectifier by connection members 16, 17 each engaging with the corresponding member or lug 11 and insulated from the bushing 6 of the disc 1 to which this lug 11 is connected by an insulating washer 13.

At each end of the rectifier a connection member 18, 19 similar to the members 16, 17 is provided for establishing electrical connection with the outermost disc and the members 18, 19 are electrically connected together by a screw-threaded rod 20. On the outer side of each of the members 18, 19 an insulating washer 13 is interposed between the member 18 or 19 and an end plate or disc 21, the whole assembly of discs, bushings, washers and connection members being clamped together on the rod 4 by means of nuts 22 at each end of the rod, spring washers 23 being interposed between the nuts 22 and the end plates 21 so as to enable any desired degree of resilient compression of the parts to be effected while permitting any expansion occurring during the operation of the rectifier.

In the rectifier illustrated the discs of each half of the rectifier are shown as connected in series with one another but it will be evident that by the provision of connection members such as those indicated at 18, 19 and connecting rods 20 any desired number or series connected groups of the discs 1 may be connected in parallel if desired. Furthermore the connection members 16, 17, 18, 19 need not necessarily be supported on the rod 4 of the rectifier but may be constituted by simple lugs electrically welded to the discs 1.

Again, the rectifying discs may be arranged to be supported on two or more rods similar to that indicated at 4 and traversing a corresponding number of holes in each disc in which case the bushings 6 for each hole in a disc may be arranged to be engaged by a single connection member such as that indicated at 11. In these and other respects the invention is not limited to the particular form and arrangement of the parts above described and illustrated by way of example.

The invention relates to apparatus for rectifying alternating electric currents of the kind comprising a number of rectifying elements each comprising a disc or plate composed of a metal or metalloid having a layer of suitable material such as a compound of the metal or metalloid formed on or applied to both faces of the disc or plate, the several plates being assembled on one or more supporting rods each passing through a corresponding hole in each plate.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a metallic plate having a layer of compound formed on each side and provided with a hole, a member of conducting material passing through said hole for supporting said plate, a conducting bushing extending through said hole, means for insulating said member from said bushing and a pair of contact washers one on each side of the plate and each engaging the adjacent compound layer and both in electrical contact with said bushing but spaced from said member.

2. In combination, a metallic plate having a layer of compound formed on each side and provided with a hole, a bushing of plastic metal extending through said hole but spaced from said plate and provided at its ends with outstanding flanges, a pair of dished contact washers one engaging the compound layer on each side of the plate, and means for pressing each said washer into electrical contact with the adjacent flange of said bushing.

3. In combination, a metallic plate having a layer of compound formed on each side and provided with a hole, a bushing of plastic metal extending through said hole but spaced from said plate and provided at its ends with outstanding flanges, a pair of dished contact washers located on said bushing on opposite sides of said plate within said flanges, and means for clamping said flanges together to produce electrical contact between the bushing and the contact washers and between the contact washers and the compound layers on opposite sides of the plate.

4. In combination, a metallic plate having a layer of compound formed on each side and provided with a hole, a bushing of plastic metal extending through said hole but spaced from said plate and provided at its ends with outstanding flanges, a pair of dished contact washers located on said bushing on opposite sides of said plate within said flanges, an insulating sleeve surrounding said bushing and within the hole in said plate, and a bolt extending through said bushing and provided with means for clamping said washers against the compound layers on said plate and against the flanges of said bushing.

5. A rectifier comprising a copper plate oxidized on each side and provided with a hole, a hollow bushing of plastic metal extending through said hole and provided at its ends with outstanding flanges, an insulating sleeve surrounding said bushing between said flanges, a pair of dished contact washers one located on said sleeve on each side of said plate and each having its outer rim engaging the adjacent oxidized side of the plate, and clamping means extending through said bushing and pressing said flanges together to provide electrical contact between the flanges and the washers and between the washers and the oxidized sides of the plate.

6. A rectifier comprising a plurality of copper plates oxidized on each side and each provided with a hole, receiving a hollow bushing of plastic metal having outstanding flanges, a pair of dished contact washers for each plate surrounding the associated bushing inside the flanges and each washer having its rim in electrical contact with the oxide on the adjacent side of the plate in a region spaced from said hole, insulating members separating the bushings of adjacent plates, an insulated bolt passing through said bushings and provided with means for clamping said flanges against the adjacent contact washers, and means for electrically connecting each copper plate with the bushing associated with the adjacent plate.

JULES DORMOY.